United States Patent [19]

Hohnl

[11] Patent Number: 5,240,461

[45] Date of Patent: Aug. 31, 1993

[54] BLOWER MOUNTING WITH BELT TENSIONER

[75] Inventor: Gary D. Hohnl, Slinger, Wis.

[73] Assignee: Deere & Company, Moline, Ill.

[21] Appl. No.: 907,476

[22] Filed: Jul. 1, 1992

[51] Int. Cl.$^5$ ............................................. F16H 7/00
[52] U.S. Cl. .................................... 474/101; 474/113
[58] Field of Search ............... 474/101, 109, 113–117, 474/133–135

[56] References Cited

U.S. PATENT DOCUMENTS

| | | | |
|---|---|---|---|
| 3,104,555 | 9/1963 | Shell | 474/113 X |
| 4,889,519 | 12/1989 | Band et al. | 474/101 |
| 5,062,258 | 11/1991 | Samejima et al. | 56/202 |
| 5,064,315 | 11/1991 | Samejima et al. | 406/100 |

OTHER PUBLICATIONS

Kubota Tractor Corporation, "Kubota Garden Tractors The New G-Series", 10 pages, published in Japan.
Copies of Polaroid Pictures, taken by Deere & Company, illustrating a Kubota blower and mower, 2 pages, published in U.S.A.
Copies of pictures, taken by Deere & Company, and one page from a parts manual of Acomevex of Italy, 2 pages, published in U.S.A.

Primary Examiner—Thuy M. Bui

[57] ABSTRACT

A mounting structure for drivingly connecting a belt driven attachment such as an auxiliary blower to a mower deck or similar implement. The connecting structure includes a pivot and sleeve arrangement between one end of the blower and the mower deck for quickly and easily positioning the blower on the mower deck. The pivot then allows for the blower to be swung around adjacent to the mower deck to permit a latching mechanism to be engaged between the mower deck and the blower. The combination latching and belt tensioning mechanism permits generally simultaneous belt tensioning for belt driven blowers as the rear of the blower is latched to the mower deck. Should the latch not be aligned and, therefore, not secure the mower to the blower deck, provision is made for the belt tensioning arrangement to not engage the blower attachment adequately with the mower's belt drive.

20 Claims, 6 Drawing Sheets

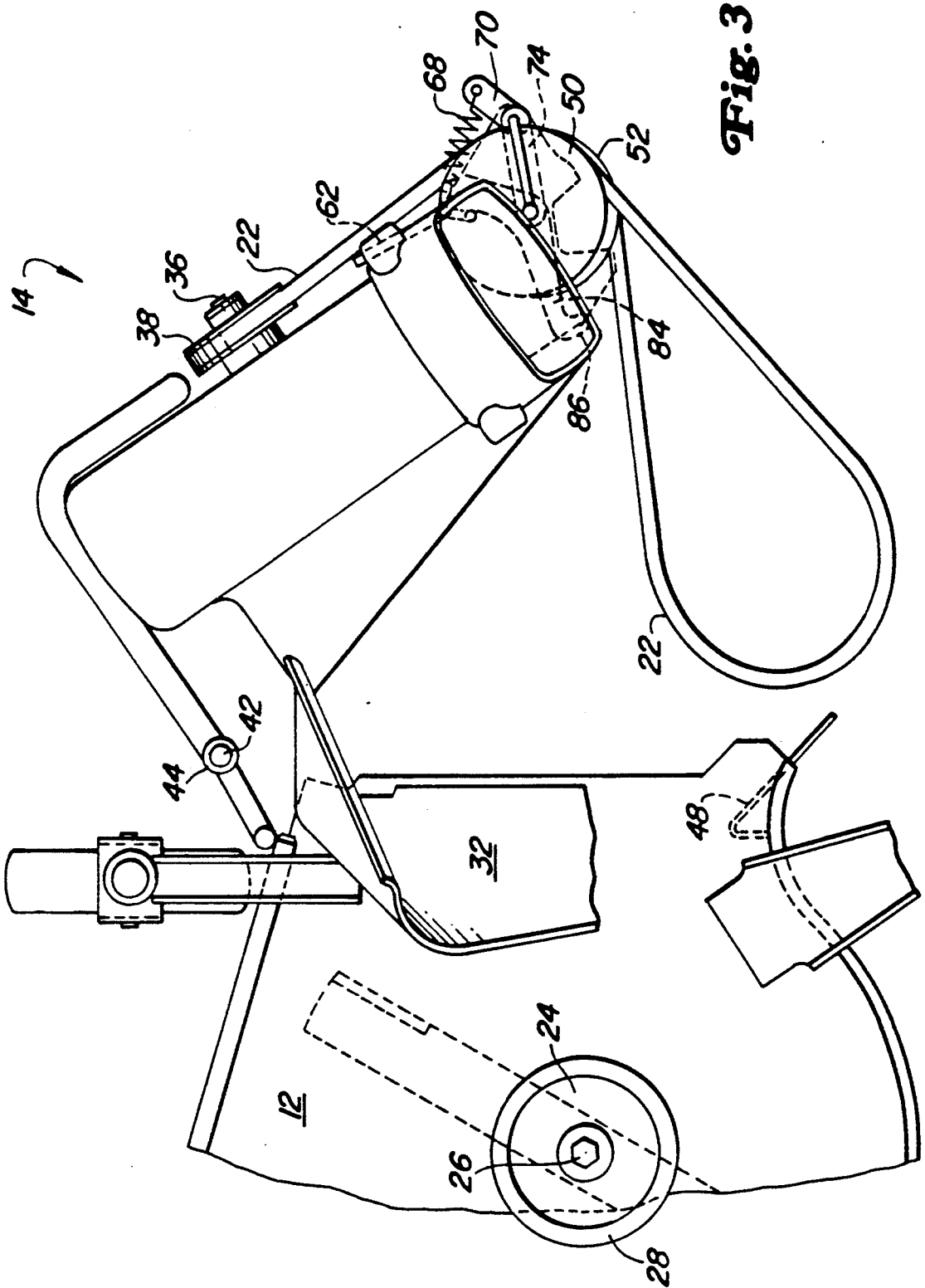

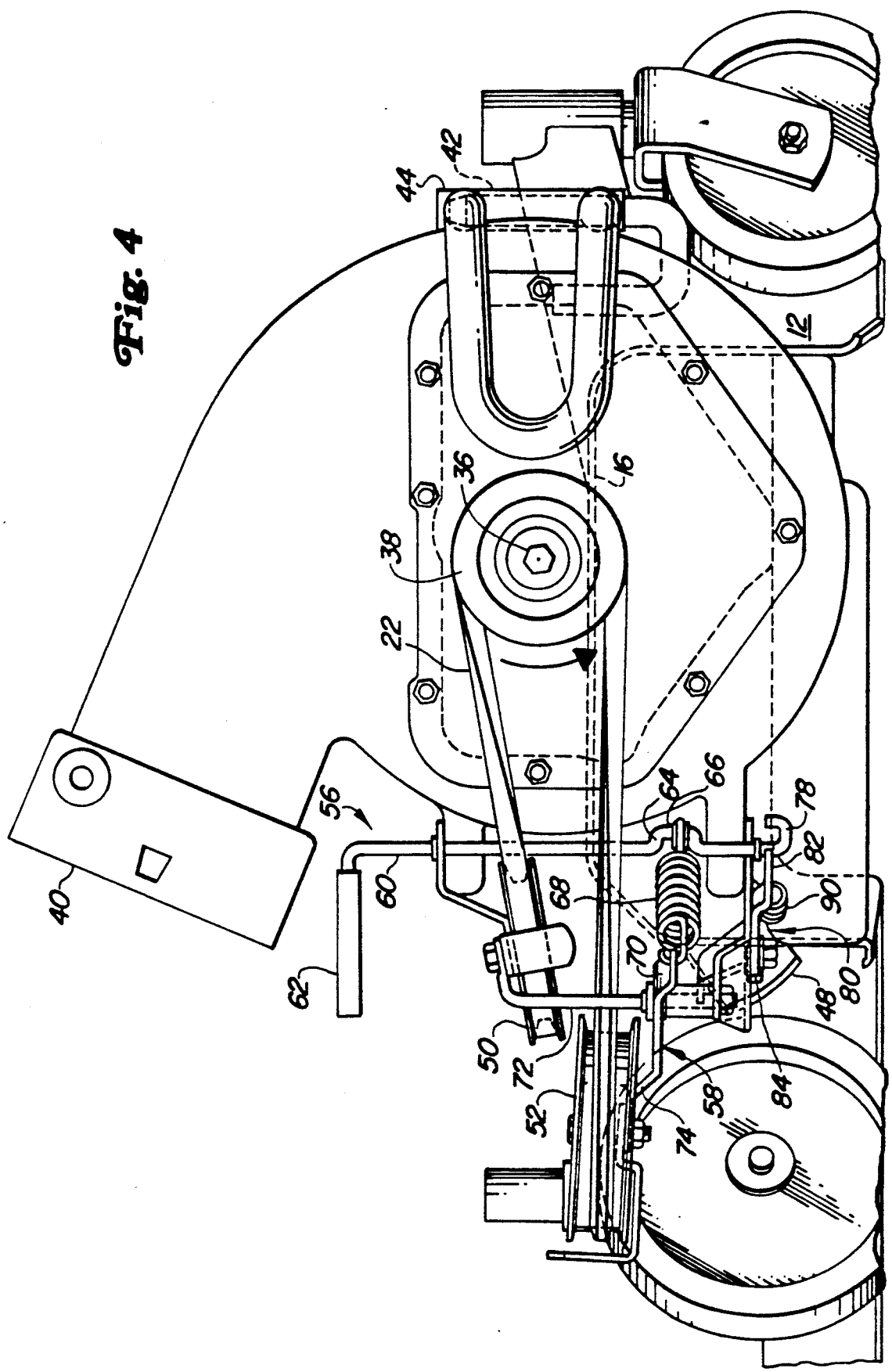

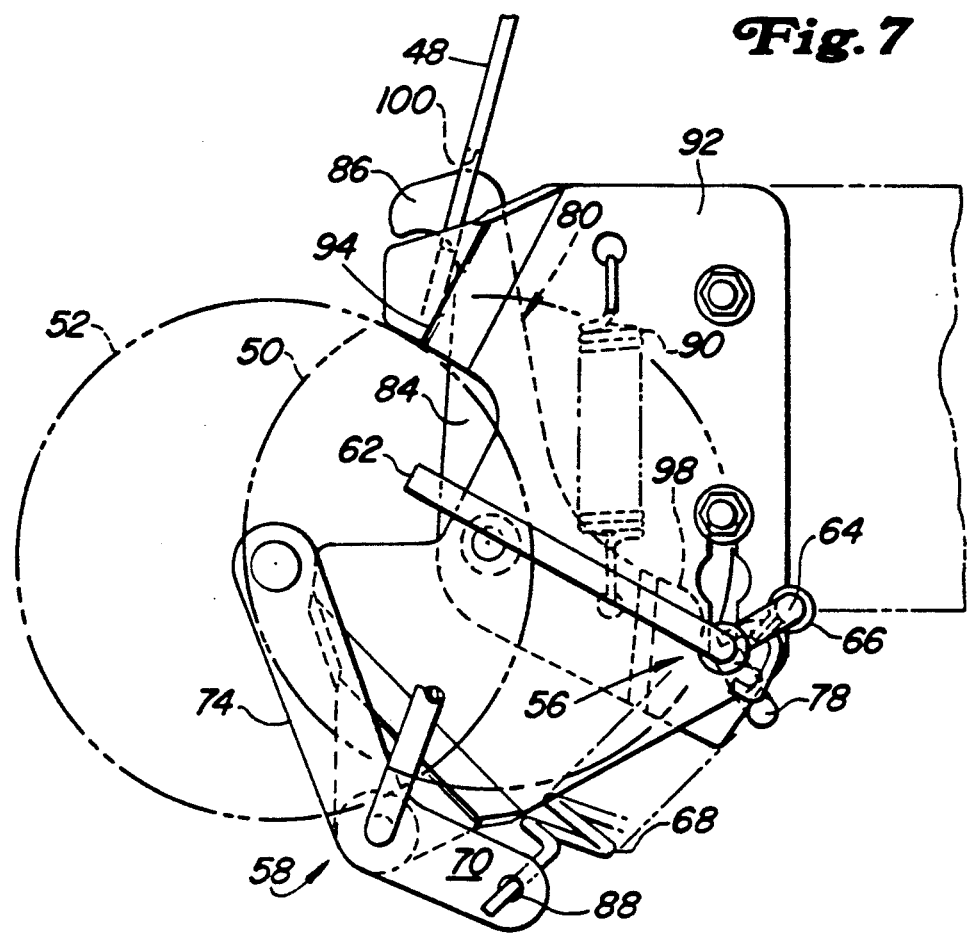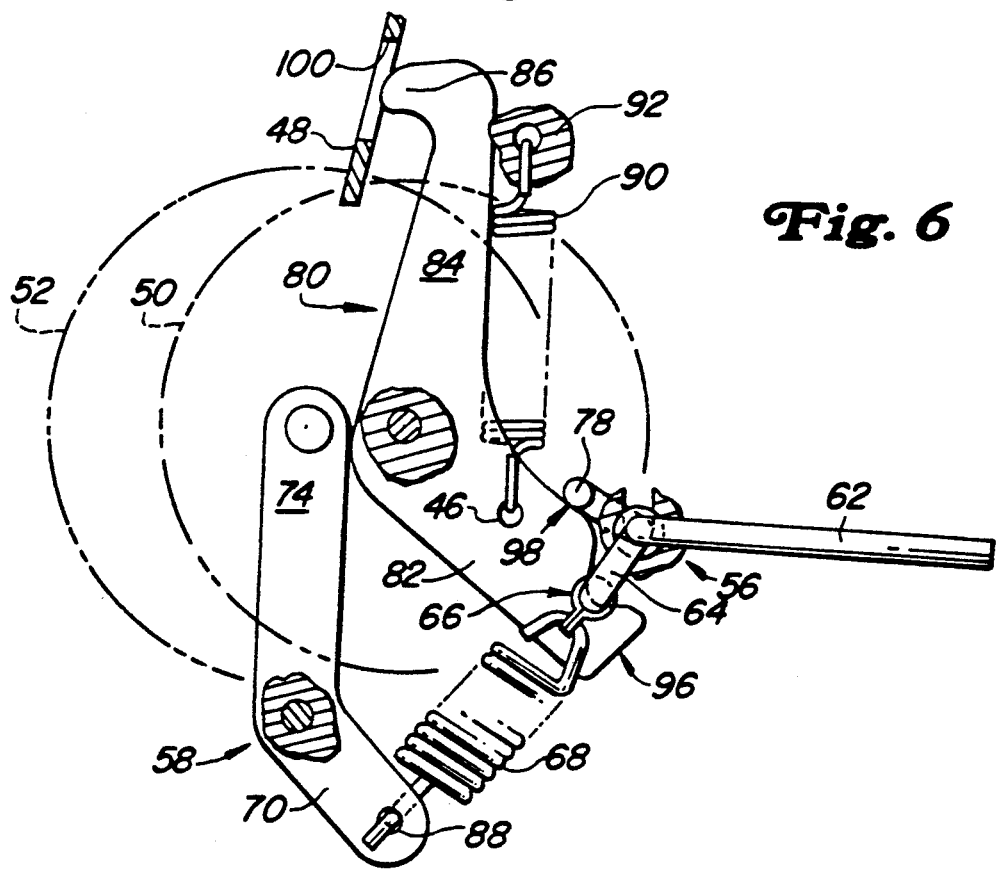

BLOWER MOUNTING WITH BELT TENSIONER

BACKGROUND OF THE INVENTION

1. Field of the Invention

The present invention relates generally to belt driven attachments which are removably mounted on implements and more particularly to the mounting and belt tensioning structure for drivingly coupling an auxiliary blower to a mower deck.

2. Description of the Prior Art

Belt driven attachments, such as auxiliary blowers used to enhance the air flow from a mower deck to a bagger or similar collecting apparatus, are often intermittently used with implement. Accordingly, they and the mower decks must be equipped with structure that permits the blower to be mounted on the deck or separated for storage.

Since blowers and similar attachments can be bulky and are often heavy, a structure for quickly and easily mounting or removing it and its belt drive is necessary.

Auxiliary blowers of the type which mount adjacent the mower deck are provided with a variety of mounting structures and blower drive mechanisms. One such mounting structure used with a shaft driven blower uses a spool-type pivot structure carried on the blower which must be slidingly positioned in a yoke-type mount carried on the deck.

Once this pivot structure has been positioned within the yoke, the blower is swung around into its position adjacent the deck and a spring loaded J-pin arrangement is inserted into a bracket to couple the rear of the blower with the implement deck. Then the shaft drive which powers the blower impeller must be connected.

Another type of shaft driven blower is provided with a mounting structure that utilizes a pin sleeve and yoke arrangement to couple one end of the blower and a toggle latch to serve the other end. The pin is first inserted through the sleeve and yoke to swingably couple the blower with the mower deck. Then it is swung around to a position adjacent the deck whereupon the rear of the blower is connected to the deck by activating a toggle latch between the mower deck and blower. The shaft drive is then coupled with the blower.

Due to the bulky and heavy nature of blower attachments, positioning such pivot structures on sleeves and within yokes can be somewhat difficult for a single individual, since the operator must carefully maneuver them into alignment.

Similarly, securing them together with the over-center toggle latch can be difficult since it can be positioned in an area that has additional structural items, such as the shaft drive, wheel support, etc.

Therefore, it would be desirable to provide a mounting structure for coupling a blower or similar attachment with a mower deck or implement which would permit the operator to easily and quickly align the attachment with the implement and quickly and easily secure them together. Additionally, it would be desirable to provide such a coupling mechanism which would be usable with a belt driven attachment and could tension the belt drive as well.

SUMMARY OF THE INVENTION

Accordingly, there is provided a mounting structure for a blower that permits quick and easy coupling of a blower with a mower deck.

At the front of the blower attachment is provided a sleeve having a vertical opening through which a mounting pin that is carried on the front of the mower deck can be inserted. The sleeve is large enough so that it can be used as a sight through which the operator can visually locate the pin and position it over the pin, all while maneuvering the large bulky blower. Once the sleeve and pin have been aligned and joined, the blower can be swung around to a position adjacent the deck at which the latch will automatically engage the blower to the deck and at which the operator can then swing a handle located at the outside of the blower attachment to tension the belt drive. This quick, easy and positive latching structure makes it easier for one individual to simply and quickly mount the blower and latch it in place.

Additionally provided with the latching system and interconnected therewith is a belt tensioner which tensions the belt drive for the blower impeller as the latching structure is activated.

The belt tensioner is comprised of a pair of bell cranks laterally spaced and vertically offset, the bell cranks being interconnected by a resilient over-center linkage. One arm of one bell crank serves as a handle for both the tensioner and latching structure, while a second arm of that bell crank is connected to the over-center linkage. One arm of the second bell crank is connected to the other end of the over-center linkage while the other arm carries the belt tensioning pulley. Accordingly, movement of the handle or first arm of the first bell crank serves to move the over-center linkage and swing the tensioning pulley to or from its belt tensioning position.

Also connected to the handle of the first bell crank is a second arm which serves to unlatch or alternately lock in place the spring loaded latching pawl. Since the second arm is rigidly connected to the first arm of the first bell crank, it swings simultaneously with the handle to unlatch the blower from the deck as the belt is untensioned or lock the spring loaded latch pawl in its position of engagement as the belt is tensioned.

The latch pawl is additionally configured to serve when it is latchingly engaged with the deck as a stop for the second arm of the first bell crank which carries the over-center linkage and, therefore, when the latch pawl is not engaged, it does not serve to stop swinging movement of the first bell crank and the belt cannot be tensioned to drive the blower. In this manner, the blower drive would not be tensioned adequately when the latch is not securely engaged with the deck.

With this structure, there is provided a combination belt tensioning and latch arrangement wherein the front and rear of the blower attachment can be quickly and easily coupled to the mower deck. Simultaneously with latching the blower to the mower deck, the belt drive is tensioned and should the latch not be properly engaged, the belt will not be tensioned adequately and the over-center belt tensioner handle will move to a position to alert the operator to the fact that the latch has not been secured.

BRIEF DESCRIPTION OF THE DRAWINGS

FIG. 3 illustrates an enlarged plan View of a portion of the deck and the blower in its partially removed position with the belt disengaged from the mower drive.

FIG. 4 illustrates a side view of the blower and deck arrangement taken along lines 4—4 of FIG. 2.

FIG. 6 illustrates a schematic view of the opertive tensioning and latching apparatus in the untensioned and unlatched configuration.

FIG. 7 illustrates a view similar to that in FIG. 6 with the tensioning and latching apparatus in the belt tensioning and latch engaged position.

DESCRIPTION OF THE PREFERRED EMBODIMENT

Figure 5:
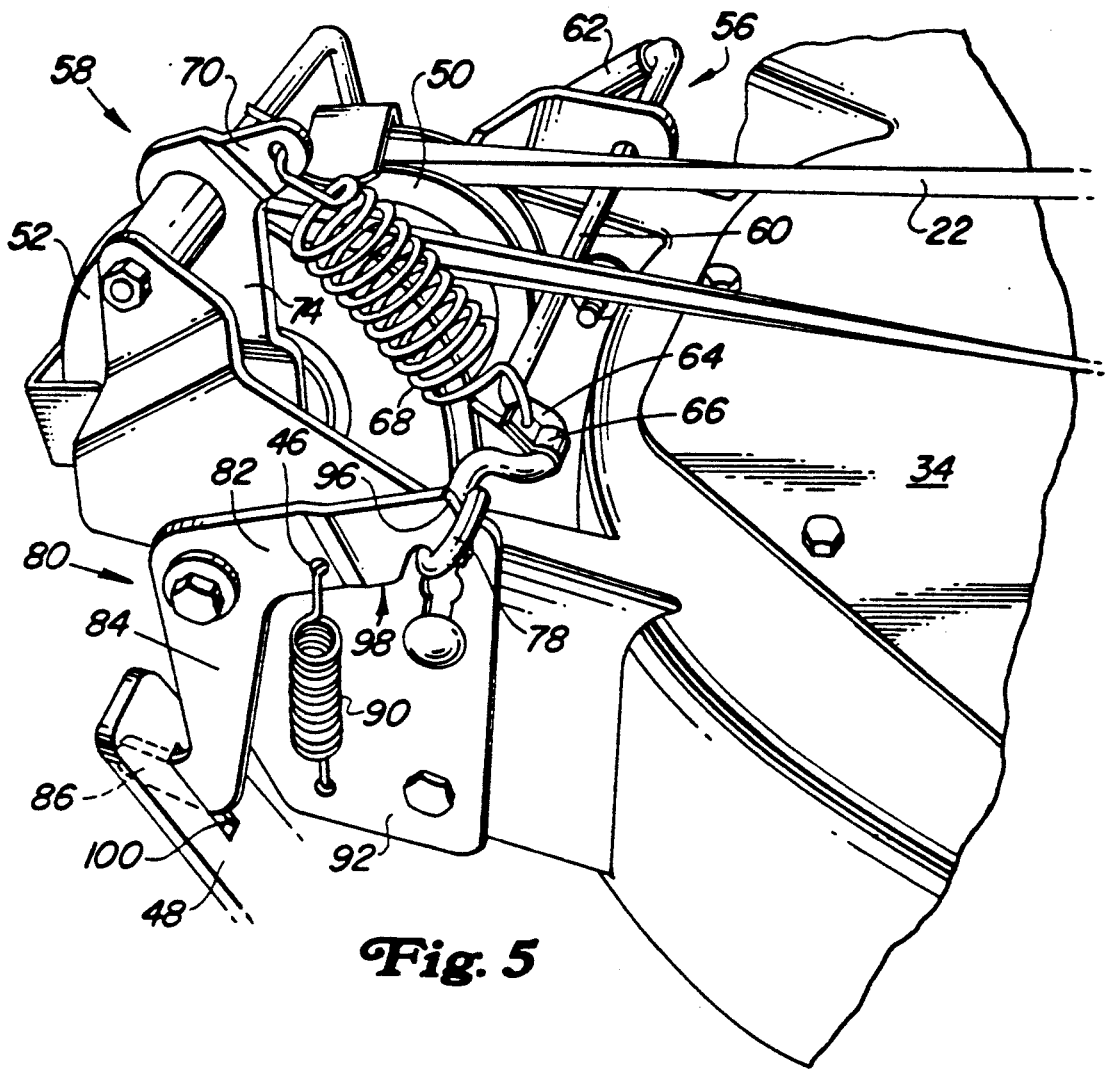
FIG. 5 illustrates an elevated perspective view of the tensioning and rear latching structure.
Figure 1:
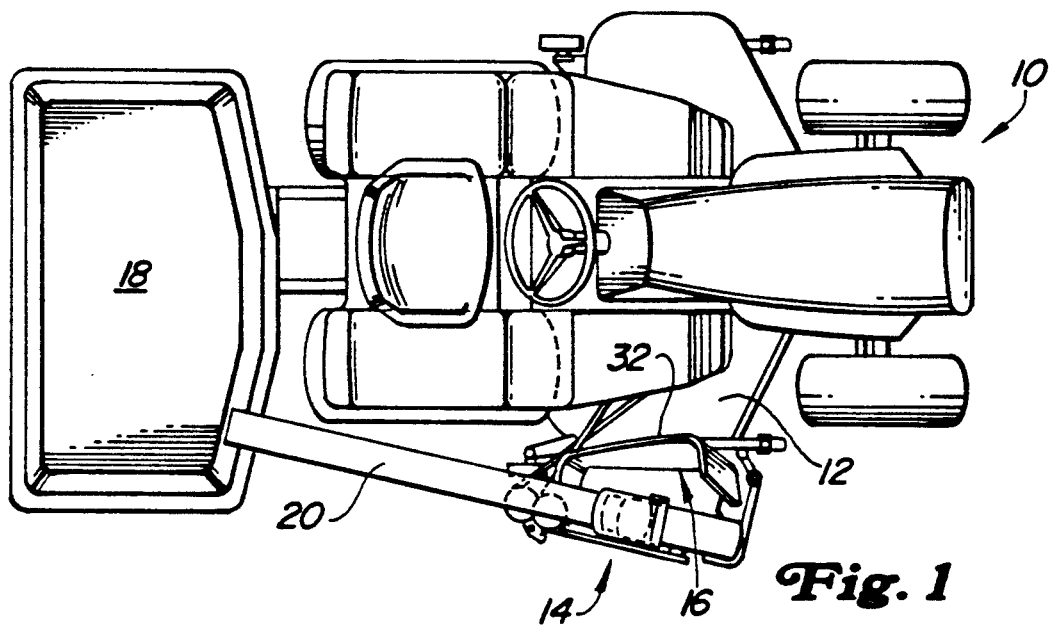
FIG. 1 illustrates in plan view a mower deck with a blower attachment carried by a lawn & garden vehicle.

Looking now to FIG. 1 there is illustrated a lawn and garden vehicle 10 having a mower deck 12 supported therebeneath with an auxiliary blower 14 attached to the discharge outlet 16 of the mower deck 12. Extending between the auxiliary blower 14 and grass collector 18 is a grass transfer duct identified by the number 20.

Figure 2:
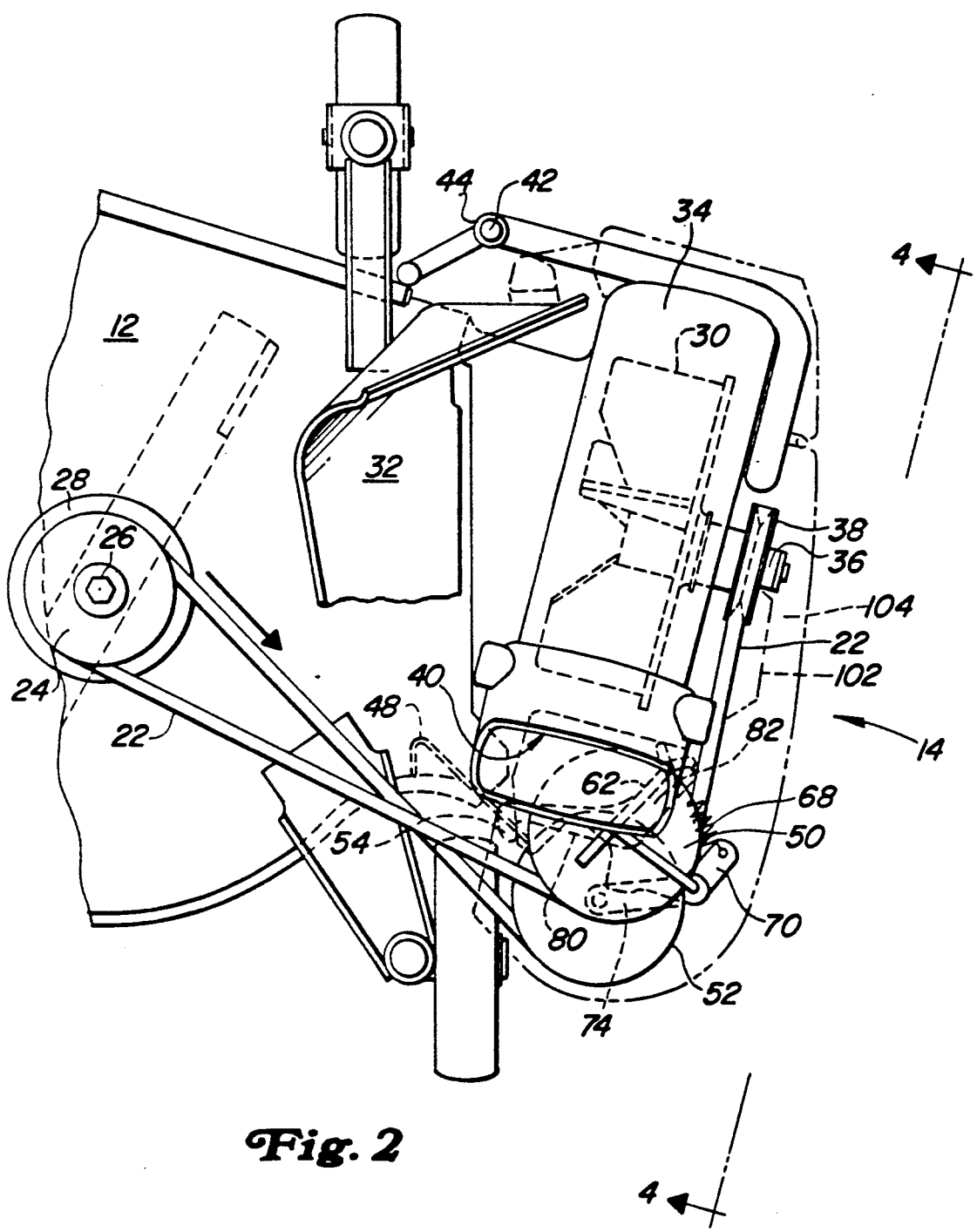
FIG. 2 illustrates an enlarged plan view of a portion of the mower deck and the blower assembly in its operative position.

Turning to FIG. 2, there is illustrated an enlarged plan and partial view of the deck 12 with its blower attachment 14. This figure illustrates the blower 14 in its operative configuration with the drive belt 22 engaged to a pulley 24 driven by a mower rotary blade spindle shaft 26. Two pulleys 24, 28 of differing diameters are provided on the mower shaft 26 to offer two speeds for the belt 22 and blower impeller 30. The mower discharge chute 32 has been raised to accommodate the mounting of the blower 14. The blower 14 includes the impeller 30, which is shown in phantom, and which is supported on a housing 34 for rotation about a shaft designated 36. The shaft 36 carries a pulley 38 around which the endless V-belt 22 is entrained. The blower housing 34 includes an outlet duct 40 adapted to convey material received from the mower deck 12 to the transfer duct 20.

The blower 14 is coupled with the mower deck 12 at its forward end by the upright pivot 42 and sleeve 44. The pivot 42 is carried on the deck 12 while the sleeve 44 is carried on the blower 14. The blower 14 is coupled to the deck 12 at its rearward position by a latch member 46 which is received in an outwardly and rearwardly extending latch receiving member 48 carried by the deck 12.

To drive the blower 14, the endless belt 22 is entrained around the blower impeller pulley 38, an idler pulley 50, the driven pulley 24 on the mower deck 12, and the tensioning pulley 52 carried at the rear of the blower 14. The impeller pulley 38 receives the belt 22 from the tensioning pulley 52, directing it back to the idler pulley 50 and on to the drive pulley 24 carried on the mower deck 12.

Looking now to FIG. 3, there is shown the structure illustrated in FIG. 2 with the blower 14 in its partially uncoupled position. In this view, the belt 22 has been disengaged from the deck drive pulley 24, the hooked end 86 of the latch pawl 80 has been disengaged from the latch receiving structure 48, and the rear portion of the blower unit 14 has been swung out from the deck 12, pivoting about the axis through the vertical pivot 42.

Turning now to FIGS. 4–8, the belt tensioning and blower latching structure is shown in greater detail. The tensioning apparatus includes first and second bell cranks 56 and 58, the first bell crank 56 comprised of the rod 60 having a handle or first lever arm 62 at its upper end and an offset or second lever arm 64 midway along its length. A fastener 66 is rotatably attached to the second lever arm 64 and in turn is connected with an over-center linkage or spring 68. The spring 68 is connected at its other end to the second lever arm 70 of the second bell crank 58 which is pivotally carried for swinging movement about the upstanding rigid rod mount identified by the number 72. The first arm 74 of the second bell crank 58 carries the belt tensioner pulley 52.

Carried at the lower end of the rod 60 is another offset or third lever arm 78 which is adapted to interact with the latching pawl 80. The latching pawl 80 takes the form of a third bell crank 80 and has first and second arms 82 and 84 extending from its fulcrum. The first arm 82 is positioned to contact the offset (third arm) 78 on the rod 60 while the second arm 84 carries a hooked latching member 86 on its outer end. The pawl's first arm 82 includes an opening 46 through which one end of a tension spring 90 is attached with the other end being attached to a bracket 92 carried on the blower 14. This spring 90 serves to urge the pawl or first latch member 80 clockwise as viewed in FIG. 5 about its pivotal fulcrum and towards engagement with the second latch member 48 carried by the mower deck 12.

Figure 8:
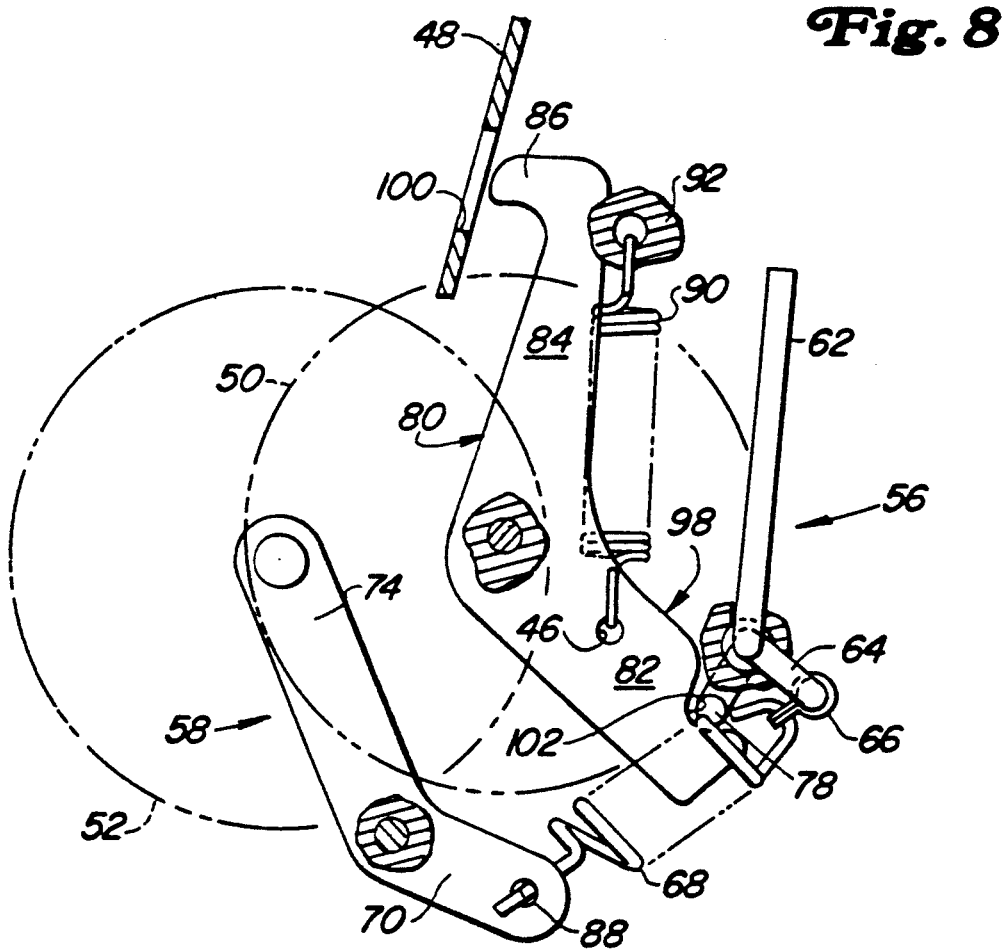
FIG. 8 illustrates a view similar to FIG. 5 with the apparatus in its latch disengaged and belt untensioned position, the handle being swung to a 12:00 o'clock position to alert the operator to the fact that the latch did not engage.

Reference is now made to FIGS. 6, 7 and 8 to review the operation of the tensioning and latching apparatus. The belt tensioning apparatus utilizes the first and second bell cranks 56 and 80. With the tension spring 68 interconnecting the two second arms 64 and 70 of the two bell cranks 56 and 58, swinging movement of the handle 62 between the positions illustrated in FIGS. 6 and 7 will tension the belt 22 since the pulley 52 will be moved counterclockwise to the position illustrated in FIG. 7. Specifically, clockwise movement of the handle 62 swings the second arm 64 of the first bell crank 56 clockwise and moves the spring 68 from a first untensioned position (FIG. 6) to a second tensioned position (FIG. 7). As the second arm 64 of the first bell crank 56 moves to the position shown in FIG. 7, the spring 68 will move to an over-center position thereby swinging the tensioning pulley 26 to the position shown in FIG. 7. To prevent further rotation of the first bell crank 56 about its vertical axis, a third lever arm 78 is carried on the first bell crank 56 for engagement with the end surface of the latch pawl 80 at 96. This stop means (composed of the third lever arm and pawl surface) 96 serves to retain the spring 68 in its over-center position and maintain tension on the V-belt 22.

Interacting with the tensioning means is the latching means which includes the spring biased pawl or third bell crank 80, and the latch member 48 carried on the deck 12. While the latching means is spring loaded towards engagement, it is also adapted to be locked in place or unlatched through use of the handle 62 on the first bell crank 56. The latching pawl 80 includes on its first lever arm 84 a set of surfaces 96 and 98 adapted to interact with the third lever arm 78 on the rod (first bell crank) 56 to either secure the latching pawl 80 in place when the belt 22 is tensioned or release it when the operator wants to remove the blower 14 or just swing it away from the deck 12 for service or maintenance. On its second lever arm 84, the pawl 80 carries the hooked first latching member 86 which is compatible with and received in the opening 100 in the tab or second latching member 48 provided on the mower deck 12.

Looking again to FIG. 6, it is seen that the latching pawl 80 is in its unlatched orientation, which could occur just prior to securing the blower 14 to the mower deck 12 or when the operator has actuated the handle 62 to disengage the hooked portion 86 of the pawl 80 from the deck latch member 48. As seen in FIG. 6, the third arm 78 of the first bell crank 56 is bearing against the side of the first arm 82 of the latching pawl at 98. Counterclockwise movement of the handle 62 (as viewed in FIG. 6) therefore causes the third arm 78 to bear on and move the pawl 80 in a clockwise direction to assure disengagement of the hooked portion 86 from the recess 100 in the second latching member 48. Since the operator will have to push on the handle 62 to unlatch the blower 14, a downwardly extending recess 102 is provided in the cowling 104 for the operator's fingers to exert a pulling force to swing the rear of the blower 14 away from the deck 12.

At the same time the pawl 80 is swung clockwise, the spring 68 would not be tensioned, as illustrated in FIG. 6 so that the second bell crank 58 and tensioning pulley 52 can easily move to the positions illustrated whereby tension on the belt 22 is relieved. In FIG. 6, the operator would unlatch the pawl 80 which would release tension on the belt 22, thereby allowing him to remove the belt 22 from the mower sheave 24 to swing the blower 14 away for either servicing or removal.

To use the present invention, an operator would first lift the blower 14 and sight through the sleeve 44 to position the sleeve 44 above the pin 42 at the front of the blower 14. Once the sleeve 44 has been positioned onto the pin 42, the discharge chute 32 would be raised so that the blower 14 could be swung back about the pivot support 42 to join the rear of the blower 14 with the edge of the deck 12. With the belt 22 not yet tensioned, it can be placed over the desired mower drive sheave 24 or 28. As the rear of the blower 14 is swung into place, the radiused end of the latch hook 86 will tend to slide into the opening 100 of the latch member 48 since it is canted or slanted to the rear and guides the hooked end 86 towards the opening 100. To further align the latch pawl 80, which is inclined downwardly and away from the deck 14, with the latch member 48, a guide plate 78 is provided on the bracket 92 to contact and slide along the top of the latch member 48 to cause the blower 14 to rise up and allow the guide plate 78 to slide along the top of latch member 48 to vertically align the hooked end 86 of the pawl 80 with the latch member 48.

Since the latch hook 86 will automatically engage the latch member 48, the operator can, when ready, tension the belt 22 by moving the handle 62 from the position shown in FIG. 6 to that shown in FIG. 7. Correspondingly, the second lever arm 64 of the first bell crank 56 would move to the position shown in FIG. 7, stretching the spring 68 and moving the first arm 70 of the second bell crank 58 to the position shown in FIG. 7 to tension the belt 22. Simultaneously, the spring 90 interconnecting the bracket 92 and the latch pawl 80 would urge the hooked end 86 of the pawl 80 into the recess 100 in the latching member 48 on the mower deck 12. Accordingly, tensioning of the belt 22 would occur at substantially the same time the blower 14 is secured to the rear connection with the mower deck 12. To hold the latching pawl 80 in place and not permit its escape from the recess 100, the third arm 78 carried on the first bell crank 56 is moved to the position behind or in abutment with the surface designated 96 on the first arm 82 of the latching pawl 80 and 15 serves as a stop against which the third arm 78 of the first bell crank 56 bears to prevent the latch hook 86 from swinging out of the latch recess 100. Accordingly, the latch pawl 80 would be retained in its engaged position when the belt 22 is tensioned.

Should the latching pawl 80 not have its hooked end 84 engaged in the recess 100 due to misalignment or other problems, the belt 22 will not be tensioned and the blower 14 will not operate. This condition is illustrated in FIG. 8. When the hooked end 86 of the pawl 80 does not seat into the recess 100, even though the spring 90 connected to the first arm 82 of the pawl 80 would tend to urge it into that recess 100, the third arm 78 of the first bell crank 56 slips past the end portion of the first arm 82 of the pawl 80 and into the recess 102 in the first arm 82. Accordingly, the spring 68 between the first arms 64 and 70 of the first and second bell cranks 56 and 58 would not be tensioned since the first arm 64 would move past its over-center position. With this arrangement, failure of the latch pawl 80 to engage results in the handle 62 moving to the 12:00 position illustrated in FIG. 8 rather than a position of approximately 10:00 as shown in FIG. 7. This handle position would visually alert the operator to the fact that the belt 22 was not tensioned and the latching mechanism was not engaged.

To thereafter engage the latch 80, the operator would simply rotate the handle 62 back around to the position in FIG. 6, swing the blower 14 away from the deck 12 and swing it in again attempting to realign the hooked end 86 of the pawl 80 with the recess 100 to assure that latching occurs as the handle 62 is moved from the position shown in FIG. 6 to that shown in FIG. 7.

With the present invention there is provided a quick and easy structure for mounting a blower to a mower deck, that structure enabling a single individual to mount the blower, swing it in, latch it and tension the belt drive. Should the latch mechanism not be engaged, there is a visual alert to the 15 operator that it has not been engaged and, in fact, the tensioning of the belt did not occur. With no tensioning of the belt, the blower drive would not be activated and the operator would then be additionally alerted to the fact that the blower had not been securely attached to the mower deck.

I claim:

1. For use with an attachment having a driven component, an implement having drive means connectable with and for powering the component; means for supportably securing the attachment with the implement and for drivingly connecting the drive means with the driven component, said means including:
   pivot and pivot receiving means between the implement and attachment for swingably connecting the attachment to the implement;
   latching means between the implement and attachment for releasably coupling the implement and attachment together, said latching means being spaced from the pivot and pivot receiving means, and
   means for drivingly connecting the drive means with the driven component as the latching means couples the implement and attachment together.

2. The invention defined in claim 1 wherein the pivot means is provided on the implement and the pivot receiving means is provided on the attachment.

3. The invention defined in claim 3 wherein the pivot means includes an upstanding pin and the pivot receiving means includes a sleeve, the sleeve being adapted to be received on the pin.

4. The invention defined in claim 1 wherein the drive means includes a drive for an endless belt and the component is adapted to be driven by an endless belt.

5. The invention defined in claim 4 wherein the means for drivingly connecting includes belt tensioning means carried on the attachment for releasably tensioning the endless belt to either drive or not drive the component.

6. The invention defined in claim 5 wherein the tensioning means includes a belt tensioning pulley movable between a first belt tensioning position and a second untensioned position and further includes locking means between the tensioning means and latching means whereby the belt tensioning means can move the pulley to its first position only when the latching means has securely coupled the implement and component together.

7. The invention defined in claim 5 wherein the tensioning means includes means for releasing the latching means to uncouple the implement and component when the tensioning means releases tension on the endless belt to not drive the component.

8. The invention defined in claim 5 wherein the belt tensioning means comprises:
first and second bell cranks, each having first and second lever arms;
the second lever arms being interconnected by a linkage means which is movable to and from an over-center position;
the first lever arm of the second bell crank carrying a belt tensioning pulley;
whereby swinging rotation of the first lever arm of the first bell crank will move the linkage means to and from its over-center position and cause the second bell crank to swing the pulley to or from a belt tensioning position.

9. The invention defined in claim 8 wherein stop means is provided to limit swinging movement of the first bell crank as it reaches an over-center position.

10. The invention defined in claim 8 wherein the linkage means is a resilient spring.

11. The invention defined in claim 8 wherein the first arm of the first bell crank includes a handle.

12. The invention defined in claim 8 wherein the latching means includes a third bell crank having first and second arms, the first arm carrying a first latch member engagable with a second latch member carried by the implement.

13. The invention defined in claim 12 wherein the latching means includes a first arm that is releasably engagable with a third arm carried on the first bell crank to either urge the second arm of the third bell crank in a first direction to retain engagement of the first and second latch members or alternately urge the second arm of the third bell crank in a second direction to release engagement of the first and second latch members.

14. The invention defined in claim 13 wherein means is provided to bias the third bell crank towards it first direction to cause engagement of the first and second latch members.

15. The invention defined in claim 1 wherein the drive means on the implement includes first and second drives for providing first and second speeds.

16. The invention defined in claim 1 wherein a plastic shroud is provided to cover the latching means and means for drivingly connecting the drive means and driven component.

17. The invention defined in claim 13 wherein means is provided to prevent the third arm of the first bell crank from urging the second arm of the third bell crank in its first direction for retaining engagement of the first and second latch members when the latch members have not been engaged.

18. The invention defined in claim 8 wherein the fulcrums of the first and second bell cranks are laterally spaced apart.

19. For use with an implement having an endless belt driving means, an attachment usable with the implement and an endless belt adapted to power the attachment when tensioned, the belt being adjustable between a tensioned and an untensioned configuration,
means for detachably coupling the implement with the attachment including
pivot and sleeve means between the implement and attachment for swingably connecting the implement to the attachment;
latching means spaced from the pivot and sleeve means for releasably coupling the implement and attachment together
the latching means including belt tensioning means adapted to tension the belt when the latching means couples the implement and attachment together.

20. For use with the combination of an implement having drive means for an endless belt, an attachment usable with the implement and having means drivable by an endless belt
means for securing the attachment with the implement including means for moving the belt between a first untensioned state where the attachment is not driven and a second tensioned state when the attachment is driven said means including:
pivot and pivot receiving structure carried between the implement and attachment for swingably connecting the attachment with the implement;
first and second bell crank means, each having first and second arms,
the second arms being interconnected by a resilient linkage which is movable to and from an over-center position;
the first lever of the second bell crank carrying a belt tensioning pulley;
a third bell crank having first and second lever arms and carrying a first latch member on an arm, the one arm being adapted to move between a first position where it is engaged with a second latch member that is carried on the implement; and
a second position where the latch members are not engaged;
means urging the first latch member towards engagement with the second latch member; and
a third lever arm carried by the first bell crank and releasably engagable with the other lever arm of the third bell crank to either urge said other lever arm in a first direction to retain engagement of the first and second latch members or alternately, urge the other lever arm of the third bell crank in a second direction to release engagement between the first and second latch members.

* * * * *